(12) United States Patent
Watanabe et al.

(10) Patent No.: US 6,698,982 B2
(45) Date of Patent: Mar. 2, 2004

(54) MACHINE TOOL

(75) Inventors: Akira Watanabe, Ritto (JP); Kensuke Ide, Ritto (JP); Tetsuo Ichikizaki, Hiroshima (JP); Seiji Horiuchi, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/230,348

(22) Filed: Aug. 29, 2002

(65) Prior Publication Data

US 2003/0091405 A1 May 15, 2003

(30) Foreign Application Priority Data

Nov. 15, 2001 (JP) ........................................ 2001-349811

(51) Int. Cl.[7] ................................................. B23C 1/00
(52) U.S. Cl. ........................ 409/168; 409/235; 409/165; 409/167; 409/241; 409/219; 483/30
(58) Field of Search ................................. 409/219, 235, 409/241, 168, 165, 167; 483/30

(56) References Cited

U.S. PATENT DOCUMENTS

| | | | | |
|---|---|---|---|---|
| 3,592,102 A | * | 7/1971 | Berthiez | 409/221 |
| 3,783,741 A | * | 1/1974 | Schadebrodt et al. | 409/80 |
| 3,930,301 A | * | 1/1976 | Wagner | 483/32 |
| 3,998,127 A | * | 12/1976 | Romeu | 409/225 |
| 4,194,543 A | * | 3/1980 | Cotton | 409/235 |
| 4,632,615 A | * | 12/1986 | Yamamura | 409/235 |
| 4,750,721 A | | 6/1988 | Sasada | |
| 4,888,865 A | * | 12/1989 | Okada et al. | 483/30 |
| 5,325,750 A | * | 7/1994 | Carlyle et al. | 409/235 |
| 5,354,159 A | * | 10/1994 | Smith | 409/235 |
| 5,569,004 A | * | 10/1996 | Marantette | 409/235 |
| 5,662,568 A | | 9/1997 | Lindem | |
| 6,012,884 A | * | 1/2000 | Azema | 409/191 |
| 6,161,995 A | * | 12/2000 | Wakazono et al. | 409/191 |

FOREIGN PATENT DOCUMENTS

| | | |
|---|---|---|
| JP | 8-318445 A | 12/1996 |
| JP | 9-262727 A | 10/1997 |
| JP | 11-235631 A | 8/1999 |
| JP | 2000-28344 A | 1/2000 |
| JP | 2000-198040 A | 7/2000 |
| JP | 2001-269827 A | 10/2001 |

* cited by examiner

Primary Examiner—A. L. Wellington
Assistant Examiner—Dana N Ross
(74) Attorney, Agent, or Firm—Birch, Stewart, Kolasch & Birch, LLP (57) ABSTRACT

A machine tool has a table body and a drive line on a bed. The table body is linearly movable via a guide member having a sliding or rolling guide surface. The drive line has a ball screw or the like, and moves the table body along the guide surface. A pair of guide members are provided at positions in point symmetry about the position of the center of gravity of the table body. Moreover, a pair of drive lines having the ball screws or the like are provided at positions in point symmetry about the position of the center of gravity of the table body. Alternatively, drive line having the ball screw or the like is provided at the position of the center of gravity of the table body.

9 Claims, 8 Drawing Sheets

MACHINE TOOL

The entire disclosure of Japanese Patent Application No. 2001-349811 filed on Nov. 15, 2001 including specification, claims, drawings and summary is incorporated herein by reference in its entirety.

BACKGROUND OF THE INVENTION

1. Field of the Invention

This invention relates to a machine tool, such as a machining center, which performs machining while moving a work table and a main spindle for a tool relative to each other.

2. Description of Related Art

In a machine tool, such as a machining center, a moving object, such as a table or a spindle head, is supported linearly movable on a structure, such as a bed or a frame, via a sliding or rolling guide surface, and is driven (relatively moved) by a drive line which causes a relative movement in the direction of the guide surface.

In this type of machine tool, the positional relationship between the guide surface and the center of gravity of the moving object is not taken into account, and the center of gravity of the moving object and the guide surface are not in the same plane parallel to the direction of movement, but they are located at relatively remote positions. Thus, when the moving object begins or stops movement by the action of the drive line, a flexural vibrating force, which deforms the structure, is increased by the inertial force of the moving object and a reaction force generated in the structure by the drive line. As a result, vibrations are liable to occur.

If machining is started before settlement of the vibrations, the surface roughness of a workpiece increases (namely, its machining precision decreases). Thus, it has been customary practice to slow down acceleration or deceleration when the moving object begins or stops movement; or to start machining after the vibrations settle. Hence, it has been impossible to shorten the machining time and thereby increase productivity.

Techniques for achieving fast acceleration and deceleration in machine tools have been proposed, for example, by Japanese Unexamined Patent Publication No. 1996-318445 and Japanese Unexamined Patent Publication No. 1999-235631. The former technique uses a linear motor as a drive source in a box frame type machine tool. The latter technique gives movement, in a direction perpendicular to each of the moving directions of first and second slides of a main spindle, as movement of a work table, whereby a uniform feeding load is exerted on a pair of drive mechanisms for driving the first slide of the main spindle, no matter what position is taken by the main spindle for a tool which moves toward and away from a workpiece on the first slide. However, neither of these techniques takes into consideration the positional relationship between a pair of guide surfaces and the center of gravity of a moving object. Hence, the aforementioned problems remain unsolved.

SUMMARY OF THE INVENTION

The present invention has been accomplished in light of the above-mentioned problems with the conventional machine tool. Its object is to provide a machine tool which can effectively suppress vibrations of a structure generated during movement of a moving object relative to the structure by a drive line, thereby shortening the machining time and increasing productivity.

According to the present invention, there is provided a machine tool comprising:
- a moving object movable along guide surfaces provided in a structure; and
- a drive line for moving the moving object, and wherein
  - the guide surfaces are provided at positions in point symmetry about a position of a center of gravity of the moving object, and
  - the drive line is provided at a position consistent with the position of the center of gravity of the moving object, or at positions in point symmetry about the position of the center of gravity of the moving object.

According to the machine tool of the present invention, vibrations of the structure, which occur when the moving object is moved relative to the structure by the drive line, can be effectively suppressed, and the machining time can be shortened to increase productivity.

In the machine tool, the position of the center of gravity of the moving object, the guide surfaces, and the drive line may be installed in the same plane parallel to the direction of movement of the moving object. In this case, the effects of the present invention can be further enhanced.

In the machine tool, a connecting portion of the drive line connected to the moving object may be installed on a line passing the position of the center of gravity of the moving object and pointing in the direction of movement of the moving object. In this case, the conditions for installation of the drive line can be easily satisfied.

In the machine tool, a pair of the connecting portions of the drive line connected to the moving object may be provided, and a midpoint between the pair of the connecting portions may be consistent with the position of the center of gravity of the moving object. In this case, the conditions for installation of the drive line can be easily satisfied.

In the machine tool, four of the guide surfaces may be provided. In this case, the effects of the present invention can be further enhanced, and the conditions for installation of guide members can be easily satisfied.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A machine tool according to the present invention will now be described in detail by an embodiment with reference to the accompanying drawings, which in no way limit the invention.

Embodiment

Figure 1:
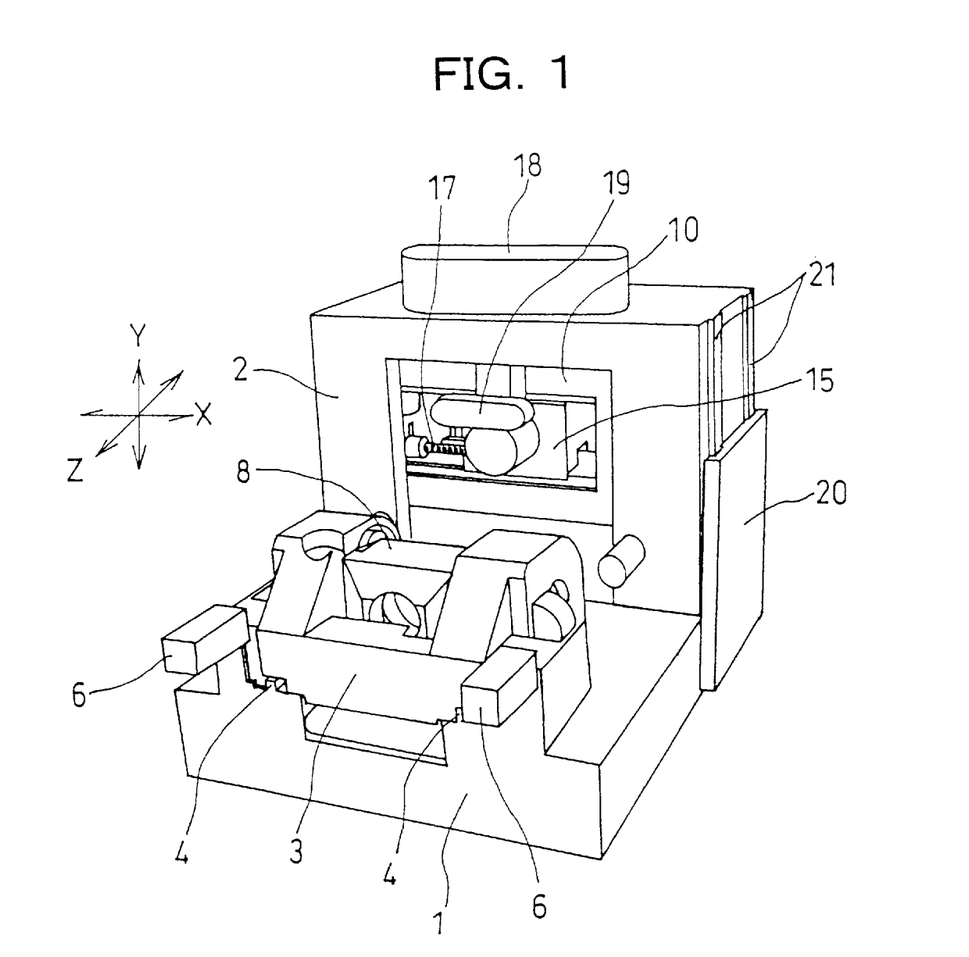
FIG. 1 is a schematic perspective view of a horizontal machining center according to an embodiment of the present invention.
Figure 2:
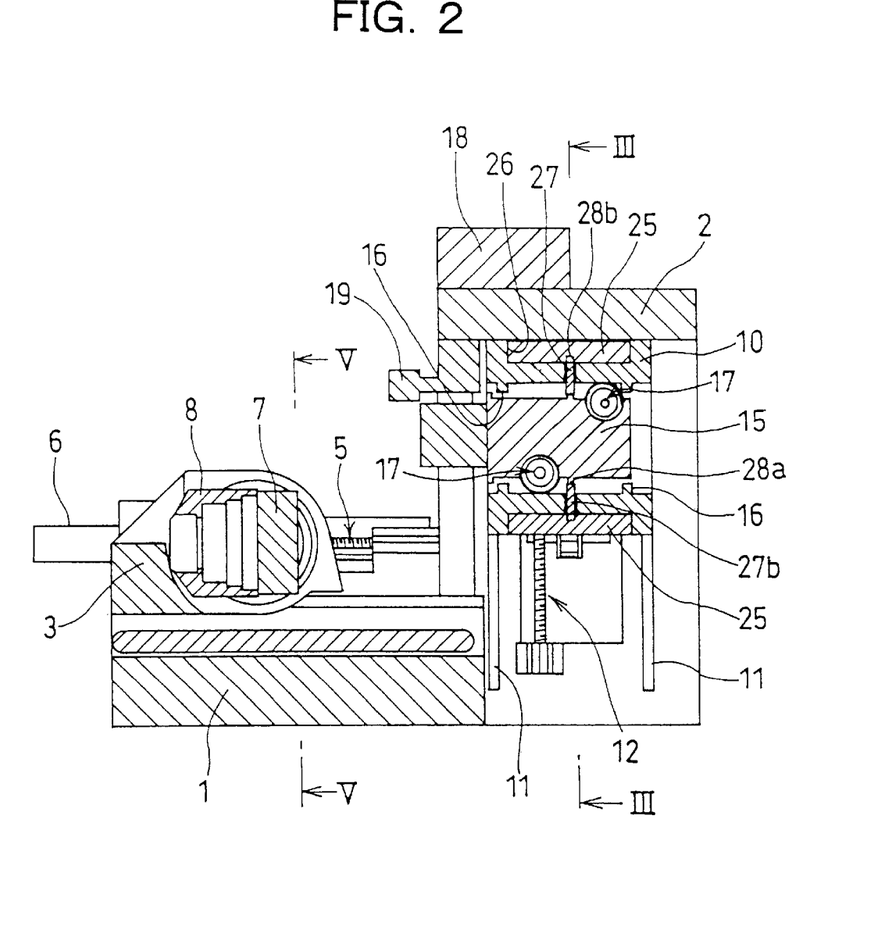
FIG. 2 is a longitudinal sectional side view of the horizontal machining center.
Figure 3:
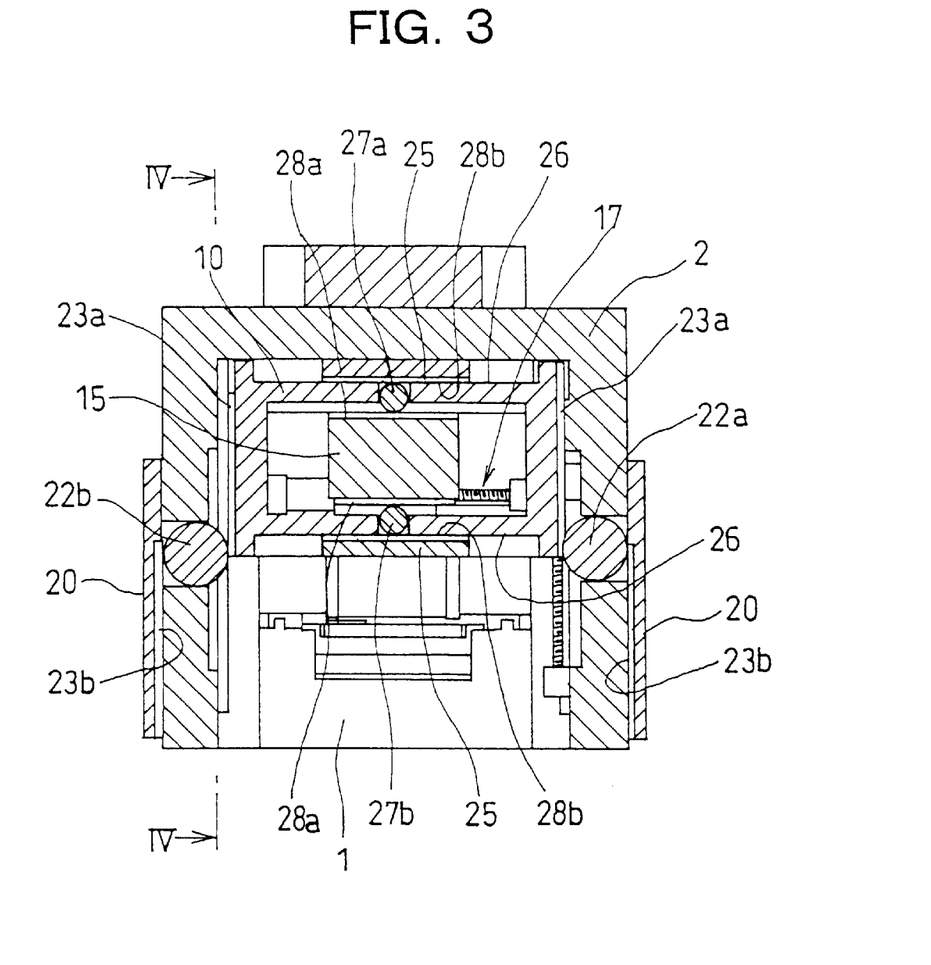
FIG. 3 is a sectional view taken on line III—III of FIG. 2.
Figure 4:
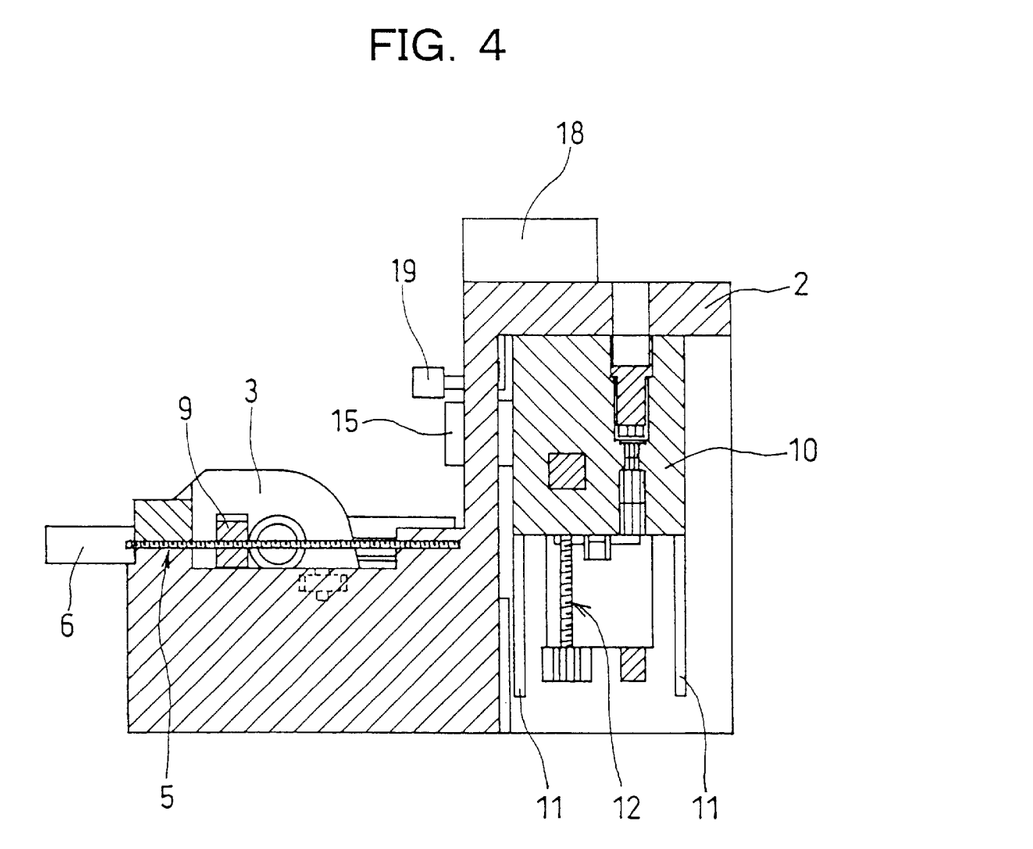
FIG. 4 is a sectional view taken on line IV—IV of FIG. 3.
Figure 5:
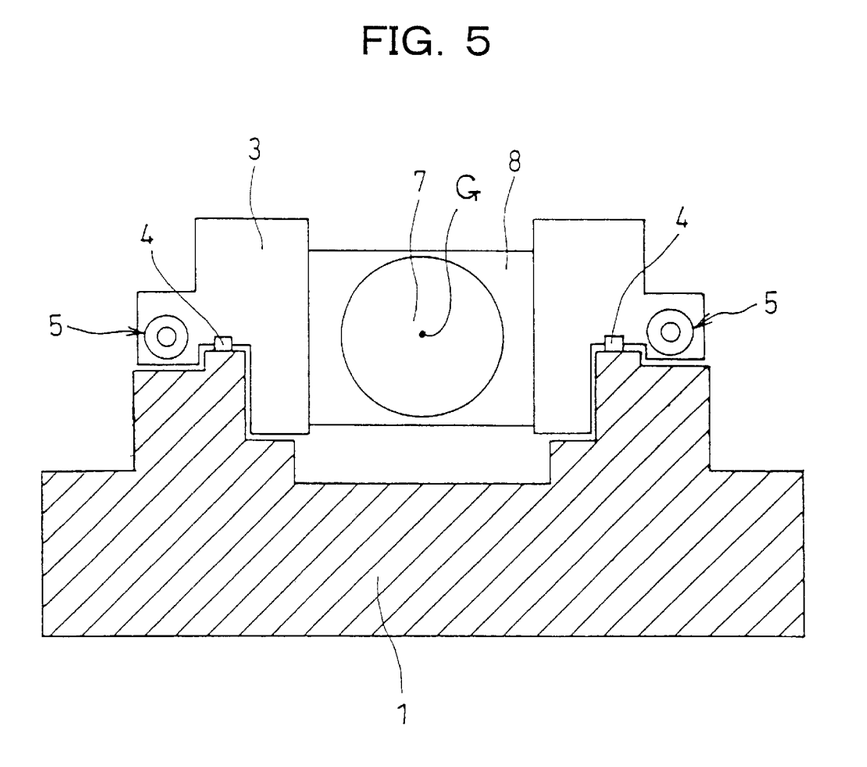
FIG. 5 is a sectional view taken on line V—V of FIG. 2.
Figure 6:
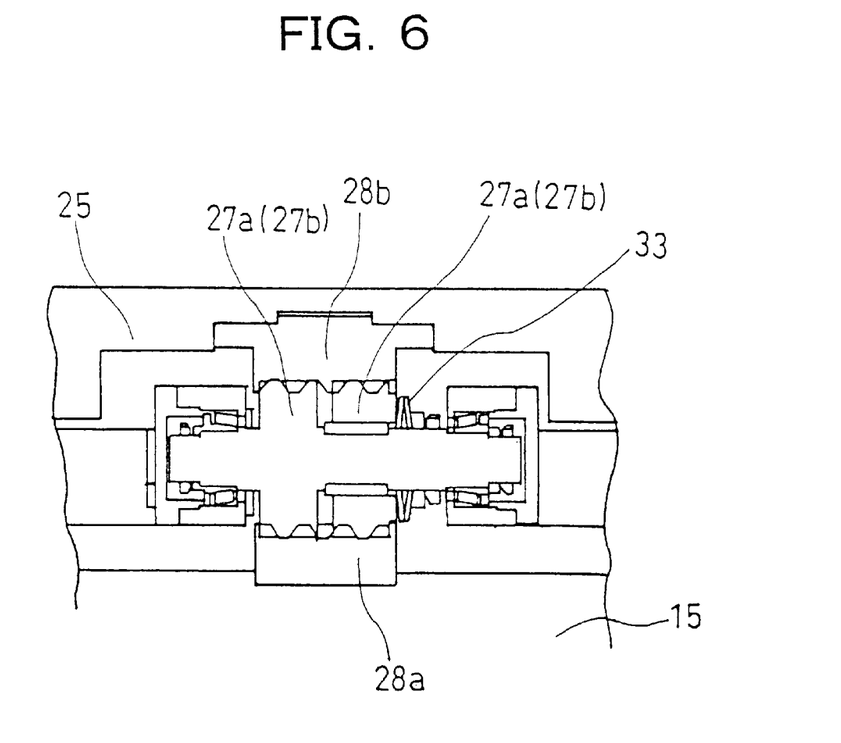
FIG. 6 is an enlarged sectional view of a rack and pinion portion.
Figure 7:
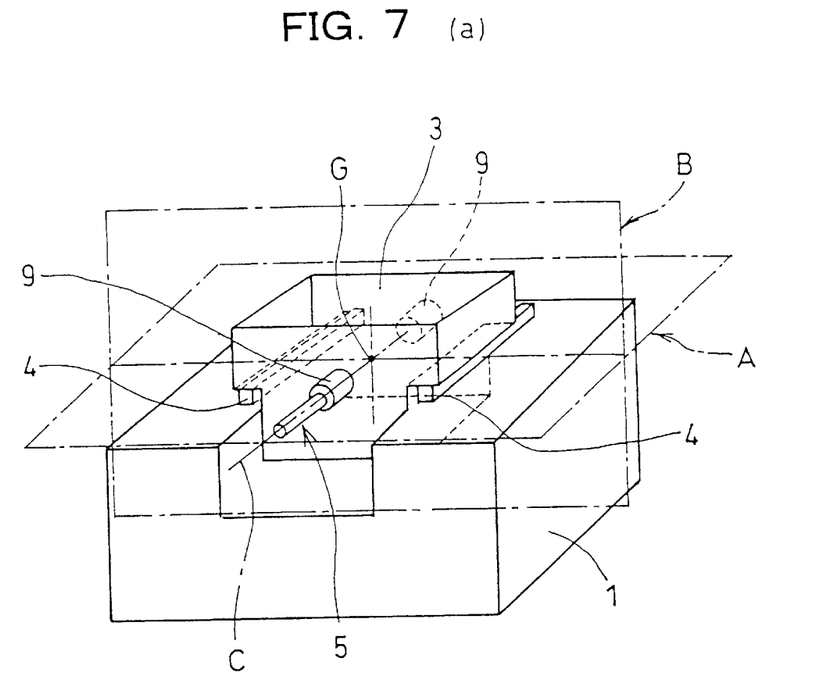
FIGS. 7(a) and 7(b) are various schematic views of the present invention.
Figure 8:
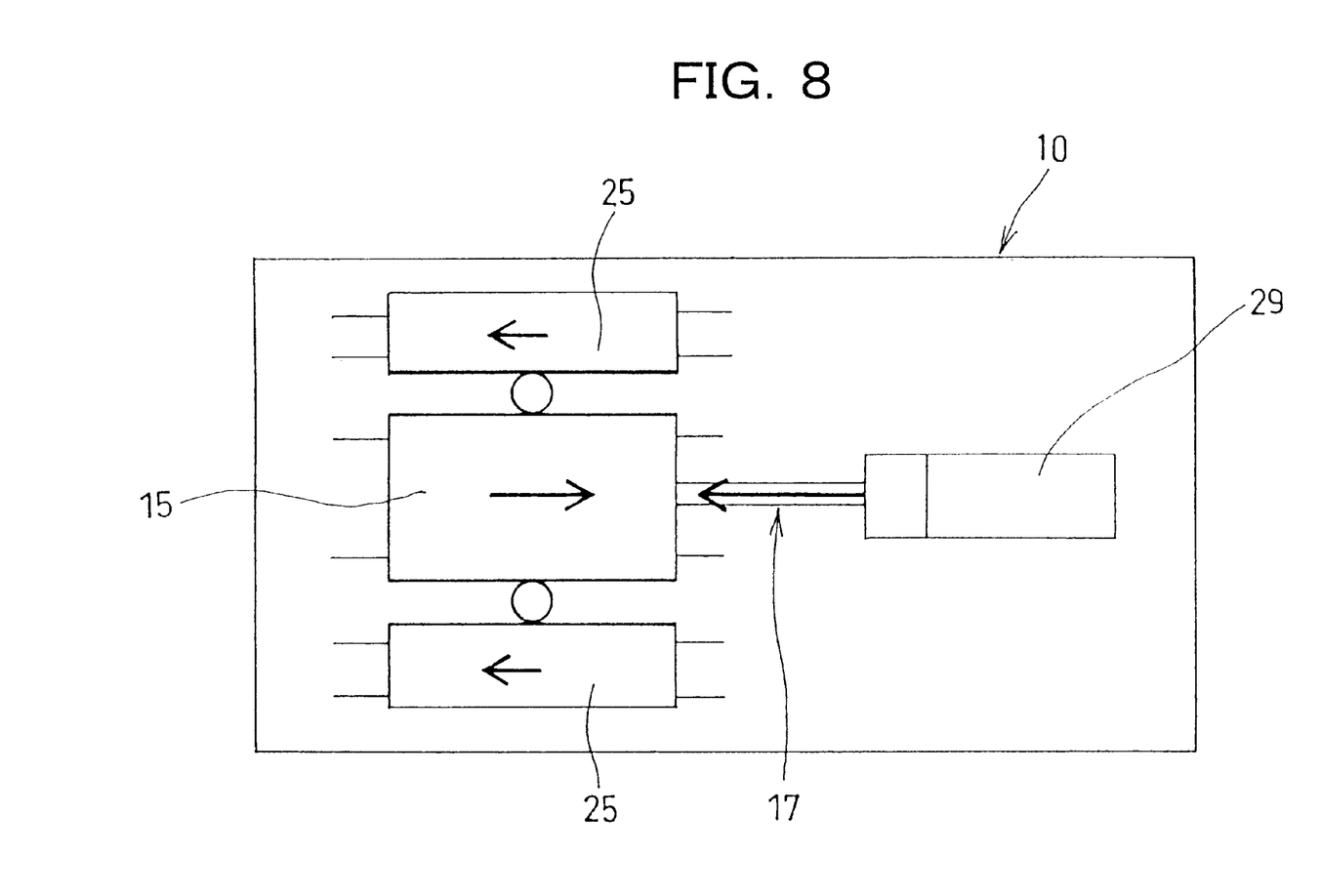
FIG. 8 is an operational explanation drawing of X-axis counterweights for a spindle head.

FIG. 1 is a schematic perspective view of a horizontal machining center according to an embodiment of the present invention. FIG. 2 is a longitudinal sectional side view of the horizontal machining center. FIG. 3 is a sectional view taken on line III—III of FIG. 2. FIG. 4 is a sectional view taken on line IV—IV of FIG. 3. FIG. 5 is a sectional view taken on line V—V of FIG. 2. FIG. 6 is an enlarged sectional view of a rack and pinion portion. FIGS. 7(*a*) and 7(*b*) are various schematic views of the present invention. FIG. 8 is an operational explanation drawing of X-axis counterweights for a spindle head.

As shown in FIGS. 1 to 5, a gate-shaped column 2 is integrally erected at a rear portion of a bed (as a structure) 1 to constitute a horizontal machining center. On the bed 1, a table body (as a moving object) 3 is disposed via right and left guide members 4 as a pair, each of which has a sliding or rolling guide surface, so as to be movable in a fore-and-aft direction (a Z-axis direction) by right and left ball screws 5 as a pair. In the drawings, numeral 6 denotes a servo motor for the ball screw 5. A tilt table 8, which rotatably supports a rotary table 7 bearing a workpiece (not shown), is tiltably assembled to and supported on the table body 3.

In the present embodiment, the right and left guide members 4 as a pair, the right and left ball screws 5 as a pair, and the table body 3 are provided such that the guide members 4, the ball screws 5, and the position of the center of gravity of the table body 3 are in the same plane parallel to the direction of movement of the table body 3, and that a midpoint between the right and left guide members 4 as a pair, and a midpoint between the right and left ball screws 5 as a pair are located at the position of the center of gravity of the table body 3.

That is, as shown in FIG. 7(*b*), the guide surfaces of the right and left guide members 4 as a pair on the bed 1 are provided so as to be in a first plane A, which includes the position of the center of gravity, G, of the table body 3 and which is parallel to the direction of movement of the table body 3. The guide surfaces are also provided so as to be close to both sides of the table body 3, and such that the distances from the center of gravity, G, of the table body 3 to the respective guide surfaces are equal. Moreover, nut portions 9 of the ball screws 5 beside the table body 3 (i.e., connecting portions of the drive line connected to the moving object) are installed at a pair of positions in a second plane B which includes the position of the center of gravity, G, of the table body 3 and which is perpendicular to the axis of the table body 3 in the direction of movement, the midpoint between the pair of positions being located at the position of the center of gravity, G, of the table body 3.

In the illustrated embodiment, the nut portions 9 of the right and left ball screws 5 as a pair are also provided in the first plane A together with the guide members 4 and the center of gravity, G, of the table body 3. However, the nut portions 9 of the ball screws 5 may be provided at any positions in point symmetry about the position of the center of gravity, G, of the table body 3 in the second plane B.

As shown in FIG. 7(*a*), moreover, if the table body 3 can be driven with a single ball screw 5, the nut portion 9 of the ball screw 5 beside the table body 3 may be installed on a straight line C including the position of the center of gravity, G, of the table body 3 and having a direction vector in the direction of movement of the table body 3.

In the gate-shaped column (as a structure) 2, a box-shaped saddle (as a moving object) 10 is disposed via right and left, front and rear guide members (having sliding or rolling guide surfaces) 11 as two pairs so as to be movable in an up-and-down direction (Y-axis direction) by right and left ball screws 12 as a pair.

In a manner similar to the manner explained in connection with FIG. 7(*b*), nut portions (not shown) of the right and left ball screws 12 as a pair are installed at a pair of positions in a plane which includes the position of the center of gravity of the saddle 10 and which is perpendicular to the axis of the saddle 10 in the direction of its movement, the midpoint between the pair of positions being located at the position of the center of gravity of the saddle 10.

The four guide members 11, when viewed in plan, are provided at positions which are on diagonals intersecting at the position of the center of gravity of the saddle 10, and which are at equal distances from the position of the center of gravity of the saddle 10.

In the box-shaped saddle 10 (as a structure), a spindle head (as a moving object) 15 is disposed via upper and lower, front and rear guide members (having sliding or rolling guide surfaces) 16 as two pairs so as to be movable in a right-and-left direction (X-axis direction) by front and rear ball screws 17 as a pair.

In a manner similar to the manner explained in connection with FIG. 7(*b*), nut portions (not shown) of the front and rear ball screws 17 as a pair are installed at a pair of positions in a plane which includes the position of the center of gravity of the spindle head 15 and which is perpendicular to the axis of the spindle head 15 in the direction of its movement, the midpoint between the pair of positions being located at the position of the center of gravity of the spindle head 15.

The four guide members 16, when viewed from the side (see FIG. 2), are provided at positions which are on diagonals intersecting at the position of the center of gravity of the spindle head 15, and which are at equal distances from the position of the center of gravity of the spindle head 15.

In the drawings, numeral 18 denotes a tool magazine installed on an upper surface portion of the column 2, and numeral 19 denotes a tool replacement arm installed on a front surface portion of the column 2.

In the present embodiment, as shown in FIG. 3, Y-axis counterweights 20 are provided on outer surfaces of right and left side walls of the column 2 via right and left, front and rear guide members 21 (see FIG. 1) as two pairs so as to be movable in a Y-axis direction. The Y-axis counterweights 20 can be moved in a direction opposite to the direction of movement of the saddle 10 by the engagement of pinions 22*a* and 22*b* rotatably supported by the right and left side walls with racks 23*a* and 23*b* engraved on the outer surfaces of right and left side walls of the saddle 10 and the inner surfaces of the Y-axis counterweights 20. That is, the Y-axis counterweights 20 achieve weight balance during movement of the saddle 10 in the Y-axis direction.

As shown in FIGS. 2 and 3, moreover, X-axis counterweights 25 are provided on outer surfaces of upper and lower walls of the saddle 10 via concave guide portions 26, which are elongated in a right-and-left direction, so as to be movable in an X-axis direction. The X-axis counterweights 25 can be moved in a direction opposite to the direction of movement of the spindle head 15 by the engagement of pinions 27*a* and 27*b* rotatably supported by the upper and lower walls with racks 28*a* and 28*b* engraved on the upper and lower surfaces of the spindle head 15 and the inner surfaces of the X-axis counterweights 25.

In the illustrated embodiment, the pinions 27*a* and 27*b* are provided in a central portion in the right-and-left direction of the saddle 10. When central portions in the right-and-left direction of the racks 28*a* beside the spindle head 15 engage the pinions 27*a* and 27*b*, central portions in the right-and-left direction of the racks 28b beside the X-axis counterweights 25 also engage the pinions 27a and 27b.

Thus, as shown in FIG. 8, the mass of the X-axis counterweight 25 on each side of the spindle head 15 is set at a half of the mass of the spindle head 15, whereby when the spindle head 15 is moved in the X-axis direction (the right-and-left direction in the drawing) by a servo motor 29 via the ball screw 17, the passive negative phase motions of the X-axis counterweights 25 are obtained, giving the damper action that the vibrating force is canceled out. Besides, as described earlier, the position of the engagement of the racks 28a on the spindle head 15 and the racks 28b on the X-axis counterweights 25 with the pinions 27a and 27b is set, whereby the position of the center of gravity of the spindle head 15 in the X-axis direction is unchanged (constant), even when the spindle head 15 is moved in the X-axis direction.

Of the pinions 22a, 22b and the pinions 27a, 27b, at least the pinions 27a, 27b and the racks 28a, 28b meshing with them are formed of helical gears and helical racks, as shown in FIG. 6. The pinion 27a or 27b is divided into two parts in the direction of its axis of rotation, and one of the parts is always urged inwardly by a coned disc spring 33 to be capable of eliminating a backlash due to the engagement of the gears.

Because of the above configuration, the positional control of the spindle head 15 during machining is exercised by the movement of the spindle head 15 per se in the X-axis direction and the movement of the saddle 10 in the Y-axis direction.

At this time, the spindle head 15 and the saddle 10, as stated earlier, are driven via the pair of ball screws 17 and the pair of ball screws 12, respectively, disposed at the positions in point symmetry about their centers of gravity, while the spindle head 15 and the saddle 10 are being guided by the two pairs of guide members 16 and 11 disposed at the positions in point symmetry about their centers of gravity. These actions decrease the inertial forces of the spindle head 15 and the saddle 10 at the start or stop of movement, and the reaction forces caused to the saddle 10 and column 2 in support of them due to the driving of the ball screws 17 and 12.

In the spindle head 15, moreover, the vibrating force is canceled out by the negative phase motions of the X-axis counterweights 25, and the position of the center of gravity in the X-axis direction is unchanged, as stated earlier. In the saddle 10, on the other hand, weight balance is achieved by the negative phase motions of the Y-axis counterweights 20, as described above.

Hence, the flexural vibrating force, which deforms the saddle 10 and the column 2, is markedly decreased, and vibrations during movement of the spindle head 15 in the X-axis direction and during movement of the saddle 10 in the Y-axis direction are effectively suppressed. Incidentally, when the spindle head 15 moves in the X-axis direction, the position of its center of gravity is unchanged, so that during movement of the saddle 10 in the Y-axis direction, load imposed is always equal for the right and left ball screws 12 as a pair.

The positional control of the workpiece on the rotary table 7 during machining is performed by the movement (feeding) of the table body 3 in the Z-axis direction, in addition to the rotation of the rotary table 7 and the tilting of the tilt table 8.

At this time, the table body 3 is driven by the pair of guide members 4 and the pair of ball screws 5 disposed in the same plane as the center of gravity, G, of the table body 3 and at the positions spaced laterally equally from the center of gravity, G, as stated earlier. This action decreases the inertial force of the table body 3 at the start or stop of movement, and the reaction force caused to the bed 1 in support of the table body 3 due to the driving of the ball screws 5.

Hence, the flexural vibrating force, which deforms the bed 1, is markedly decreased, and vibrations during movement of the table body 3 in the Z-axis direction are effectively suppressed.

Consequently, with the present machining center, the machining time can be shorted to increase productivity. Furthermore, it is easy to exercise various types of control when the saddle 10 housing the spindle head 15 is moved within the column 2.

While the present invention has been described by the foregoing embodiment, it is to be understood that the invention is not limited thereby, but may be varied in many other ways. For example, the drive line is not limited to the ball screws and servo motors, but may be other means. The guide members may be linear guides, etc. Such variations are not to be regarded as a departure from the spirit and scope of the invention, and all such modifications as would be obvious to one skilled in the art are intended to be included within the scope of the appended claims.

What is claimed is:

1. A machine tool comprising:
    a moving object movable along guide surfaces provided in a structure at positions in point symmetry about a position of a center of a gravity of the moving object; and
    a drive line for moving the moving object and provided at a position consistent with the position of the center of gravity of the moving object, or at least at positions in point symmetry about the position of the center of gravity of the moving object.

2. The machine tool of claim 1, wherein the position of the center of gravity of the moving object, the guide surfaces, and the drive line are installed in the same plane parallel to a direction of movement of the moving object.

3. The machine tool of claim 1, wherein a connecting portion of the drive line connected to the moving object is installed on a line passing the position of the center of gravity of the moving object and pointing in a direction of movement of the moving object.

4. The machine tool of claim 1, wherein a pair of the connecting portions of the drive line connected to the moving object are provided, and a midpoint between the pair of the connecting portions is consistent with the position of the center of gravity of the moving object.

5. The machine tool of claim 1, wherein four of the guide surfaces are provided.

6. The machine tool of claim 1, wherein
    said drive line includes at least one connecting portion attached to the moving object, the connecting portions being provided on an imaginary plane which includes the position of the center of the gravity of the moving object and perpendicular to a direction of movement of the moving object.

7. The machine tool of claim 1, further comprising:
    a pair of counterweights mechanically connected to the moving object, the pair of counterweights move in a direction opposite to a moving direction of the moving object to establish weight balance during movement of the moving object.

8. The machine tool of claim 7, wherein a mass of each of said pair of counterweights is half of a mass of the moving object.

9. A machine tool comprising:

a moving object movable along guide surfaces provided in a structure, the guide surfaces being provided at positions in point symmetry about a position of a center of a gravity of the moving object; and a drive line for moving the moving object, the drive line being provided at a position consistent with the position of the center of gravity of the moving object.

* * * * *